(12) United States Patent
Kao

(10) Patent No.: US 9,421,835 B2
(45) Date of Patent: Aug. 23, 2016

(54) HANDGUARD STRUCTURE FOR MOVABLE SCOOTER

(71) Applicant: Chia-Liang Kao, Hsinchu (TW)

(72) Inventor: Chia-Liang Kao, Hsinchu (TW)

( * ) Notice: Subject to any disclaimer, the term of this patent is extended or adjusted under 35 U.S.C. 154(b) by 0 days.

(21) Appl. No.: 14/541,092

(22) Filed: Nov. 13, 2014

(65) Prior Publication Data

US 2016/0137011 A1    May 19, 2016

(51) Int. Cl.
| | | |
|---|---|---|
| *B62B 3/00* | (2006.01) | |
| *B25H 5/00* | (2006.01) | |
| *A47L 13/62* | (2006.01) | |
| *B60D 1/04* | (2006.01) | |
| *B62B 3/02* | (2006.01) | |

(52) U.S. Cl.
CPC ... *B60D 1/04* (2013.01); *B62B 3/00* (2013.01); *A47L 13/62* (2013.01); *B25H 5/00* (2013.01); *B62B 3/02* (2013.01)

(58) Field of Classification Search
CPC .......... A47L 13/62; A63C 17/01; B25H 5/00; B60D 1/04; B62B 3/00; B62B 3/02; B62K 3/002
USPC ............ 280/29, 30, 31, 32, 32.5, 32.6, 87.01, 280/87.021, 87.041, 87.042
See application file for complete search history.

(56) References Cited

U.S. PATENT DOCUMENTS

| | | | | |
|---|---|---|---|---|
| 5,823,549 A * | 10/1998 | Morgan, Jr. | ............ | B62B 5/0083 108/53.3 |
| 5,863,053 A * | 1/1999 | Berry | ....................... | B25H 5/00 280/32.6 |
| 6,345,828 B1 * | 2/2002 | Pool | ......................... | B25H 5/00 280/32.6 |
| 6,561,530 B2 * | 5/2003 | Carbonero | .......... | A63C 17/0033 280/79.11 |
| 6,979,005 B1 * | 12/2005 | McLerran | ................. | B62B 3/00 108/53.1 |
| 7,213,819 B2 * | 5/2007 | Carbonero | .......... | A63C 17/0033 280/32.6 |
| 7,478,818 B1 * | 1/2009 | Whiteside | ................ | B25H 5/00 280/32.5 |
| 8,899,604 B2 * | 12/2014 | Orenstein | .......... | A63C 17/0026 280/200 |
| 2012/0299257 A1 * | 11/2012 | Kinnee | ................... | A45C 5/146 280/30 |
| 2013/0001916 A1 * | 1/2013 | Orenstein | .......... | A63C 17/0026 280/200 |
| 2014/0232075 A1 * | 8/2014 | Whiteside | ................ | B25H 5/00 280/32.6 |
| 2015/0021869 A1 * | 1/2015 | Morgan, Jr. | ............ | A47C 9/027 280/32.5 |

* cited by examiner

*Primary Examiner* — Paul N Dickson
*Assistant Examiner* — Marc A Scharich
(74) *Attorney, Agent, or Firm* — Leong C. Lei

(57) ABSTRACT

Disclosed is a wheeled scooter having a main body with a bottom, a front side, a rear side and two opposite lateral sides. A plurality of engagement lugs are formed on the front side of the main body. A plurality of engagement grooves are formed in the rear side of the main body and are adapted to engage with engagement lugs on a main body of an additional scooter to connect the main body of the scooter to the main body of the additional scooter. The scooter includes a grip mounted to each respective lateral side of the main body, each grip including an inner bar and an outer bar operably mounted to the respective lateral side of the main body by front and rear bars. The outer bar of each grip is configured to shield and protect a user's hand while holding the inner bar.

5 Claims, 7 Drawing Sheets

HANDGUARD STRUCTURE FOR MOVABLE SCOOTER

TECHNICAL FIELD OF THE INVENTION

The present invention relates to a carrier for freight transportation or amusement ride, and more particularly to a handguard structure for a movable scooter, capable of protecting a user's hands from being injured while moving the scooter.

DESCRIPTION OF THE PRIOR ART

The structures of two representative conventional combination-type movable scooters are shown in FIGS. 1 and 2. A plurality of wheels are configured on the bottom of the scooter, and a grip is respectively formed on the left and right sides thereof. Furthermore, a plurality of engagement projections are configured on the front side face of the scooter, and a plurality of engagement grooves the relative positions at the rear side face, allowing a plurality of single scooters to be coupled together to form a scooter type in a long line by inserting the engagement projections in the corresponding engagement grooves, which can be moved as one's will. This scooter line is used to not only mount freights but allow people to sit thereon for recreational sports; this kind of scooter provides a convenient and practical tool for heavy freight transportation, being a practical and interesting recreational implement, but it has a disadvantage in structure found upon use. When a user moves a scooter upon freight transportation or amusement ride by hands, as FIG. 1 shows, the both hands grasp the respective side frame bars of the grips, and in the meantime the backs of the hands are exposed outside the grips. If there is something wrong, the hands hit a wall or other rigid objects easily, causing the hands to be injured.

SUMMARY OF THE INVENTION

The object of the present invention is to provide a handguard structure for a movable scooter, in which a longitudinal or transverse inner bar is configured inside each frame-typed grip of the main body thereof, allowing the hands of a user to grasp the inner bars and position inside the grips to protect the hands from being injured by hitting a wall or other rigid objects to when a user moves the scooter by hands upon freight transportation or amusement ride.

DETAILED DESCRIPTION OF THE PREFERRED EMBODIMENTS

Figure 1:
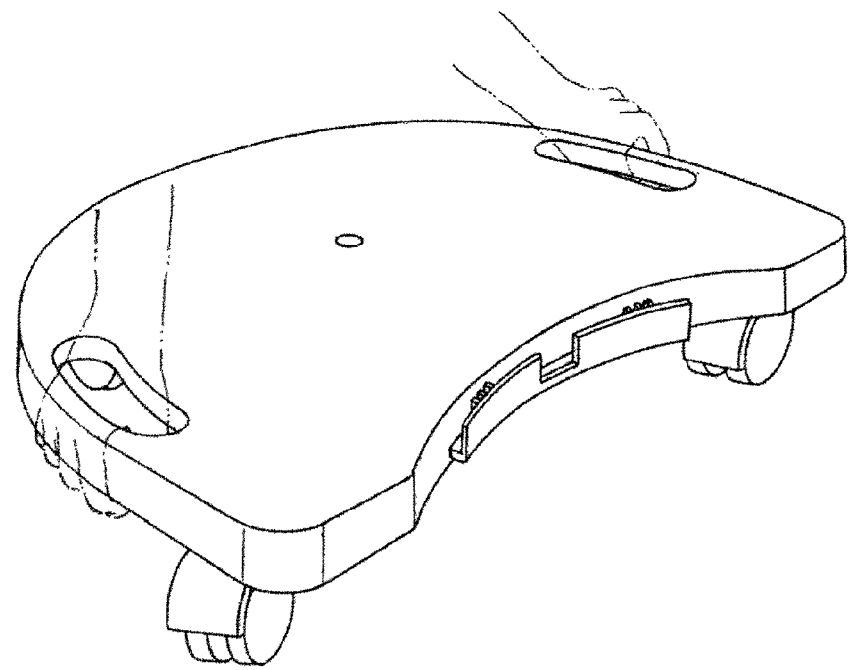
FIG. 1 is a schematically perspective view of a conventional movable scooter showing a state of a human's hands grasping the grips thereof.
Figure 2:
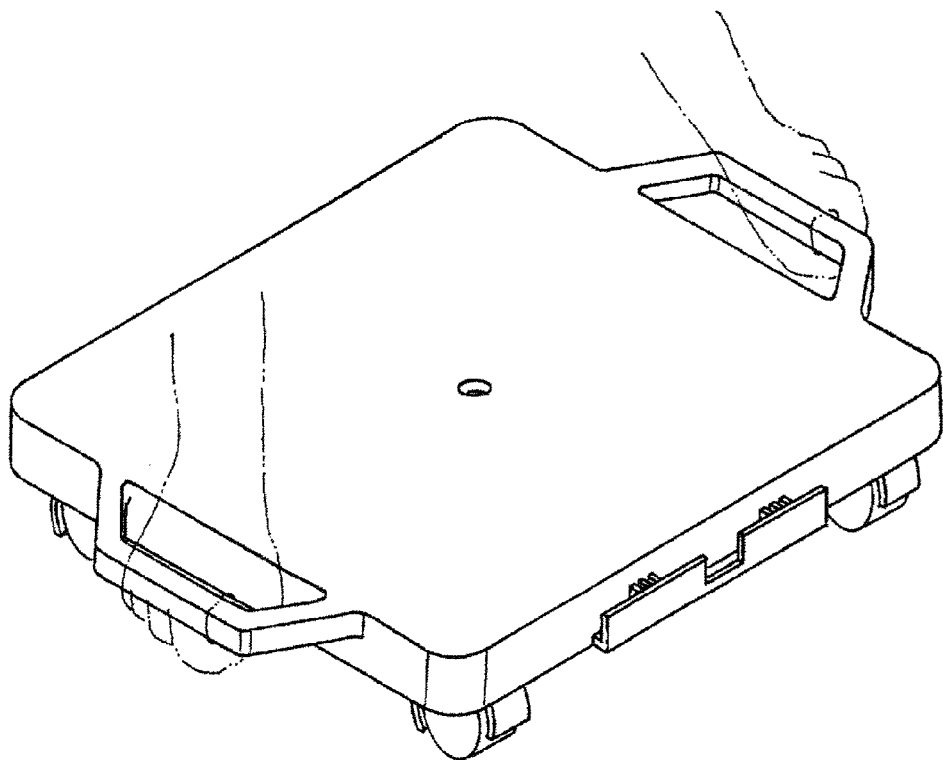
FIG. 2 is a schematically perspective view of another conventional movable scooter showing a state of a human's hands grasping the grips thereof.
Figure 3:
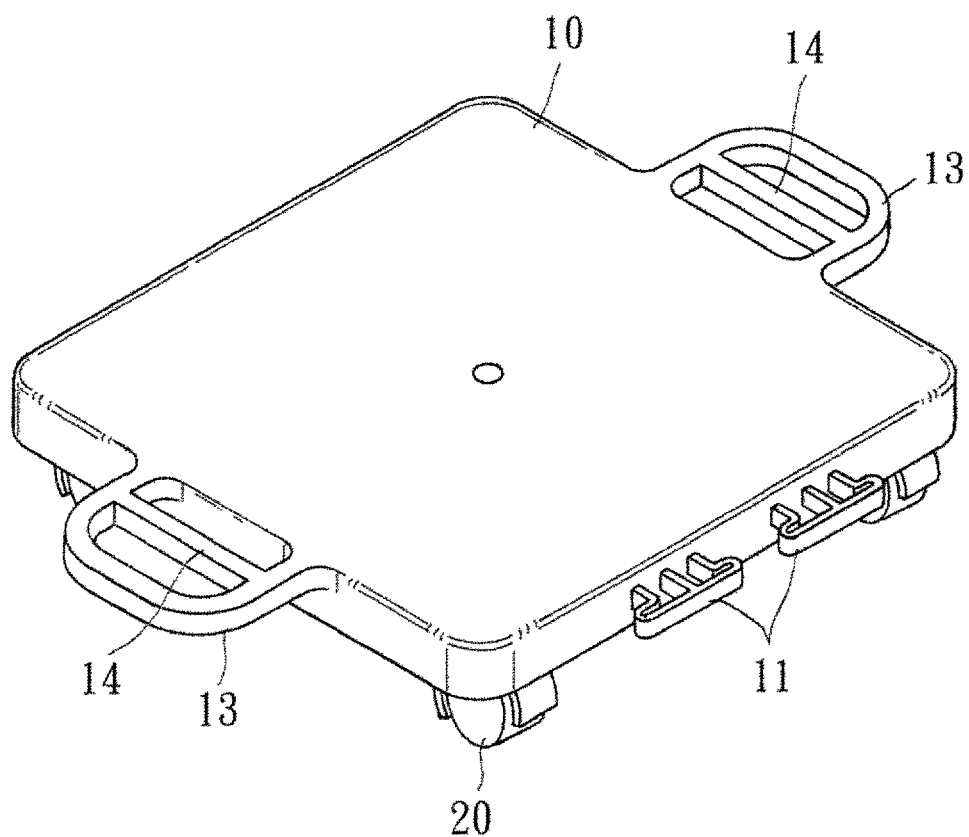
FIG. 3 is a schematically perspective view of a movable scooter of the present invention.
Figure 4:
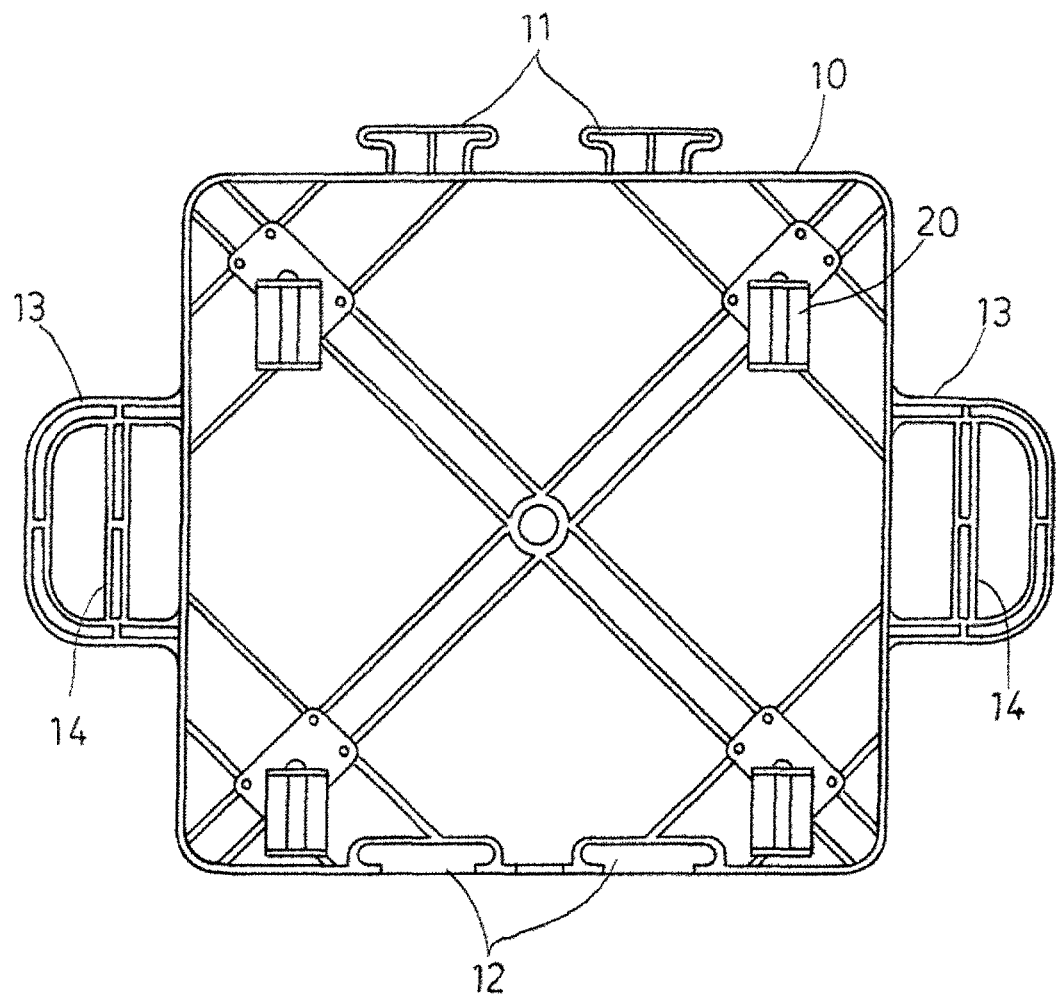
FIG. 4 is a bottom view of a preferred embodiment of the movable scooter of the present invention.
Figure 5:
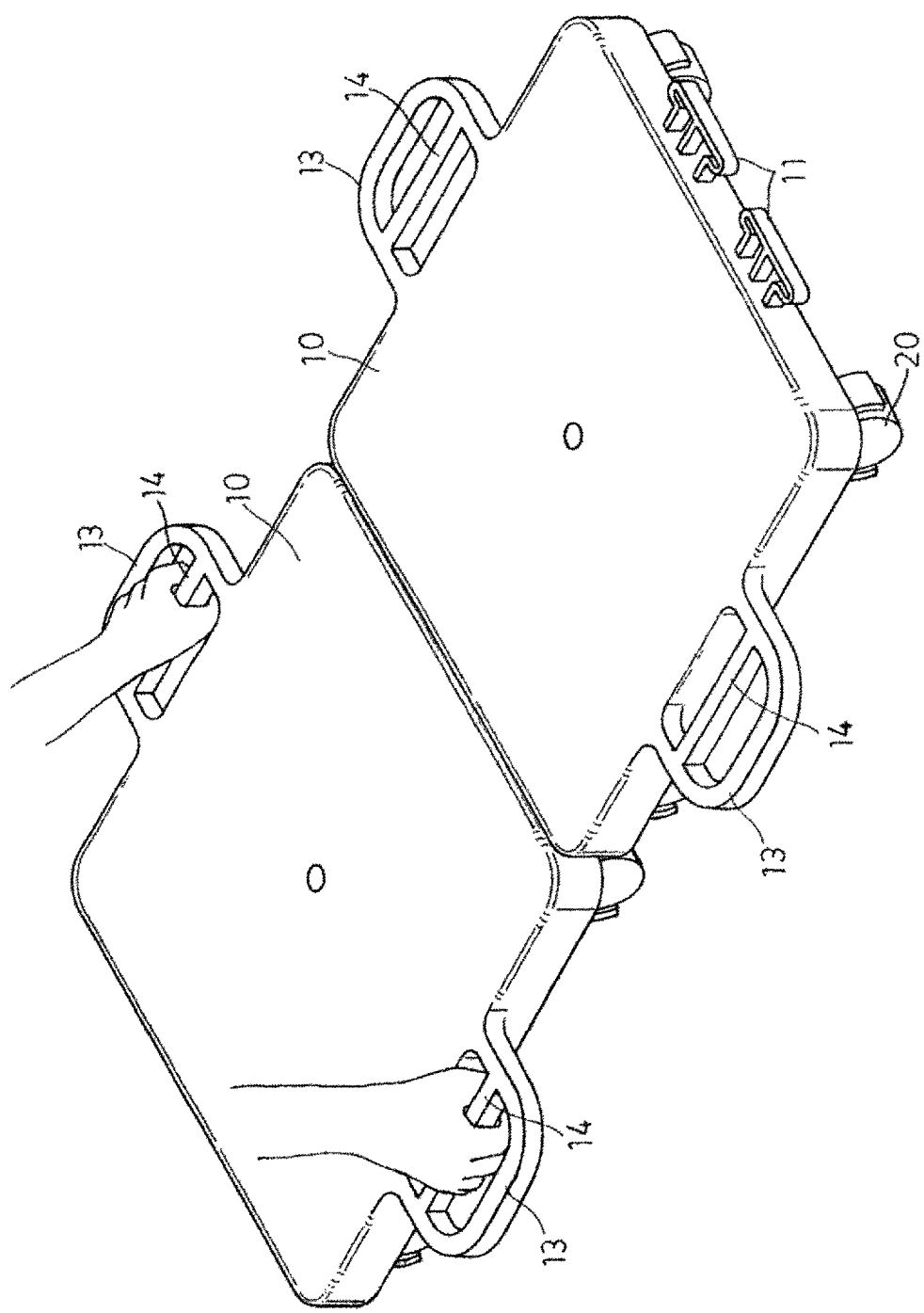
FIG. 5 is a schematically perspective view of the movable scooter arranged in series of the present invention in a use state.

The present invention is a handguard structure for a movable scooter, being a single plate body with wheels 20 on the bottom thereof, where a plurality of scooters can be coupled together to form a combined scooter form which can be moved as one's will. Referring to FIGS. 3 and 4, a frame-typed grip 13 is respectively configured on the left and right sides of a single main body 10, two or more projecting engagement convex lugs 11 are formed on the front side of the main body 10, and engagement grooves 12 with a shape and dimension being the same as the engagement lug are configured on the positions of the rear side face of the main body 10 relative to the engagement lugs 11, where both the engagement lug 11 and the engagement groove 12 may be a T-shaped body. Furthermore, the engagement lugs 11 of the main body 10 being inserted in the corresponding engagement grooves 12 of the other main body 10 can assemble a plurality of single main bodies together to form a movable scooter as FIG. 5 shows. The present invention is characterized in that a longitudinal inner bar 14 is configured between the left and rear bar bodies of each frame-typed grip 13 and located at the center thereof, allowing a user's hands to grasp the inner bars 14 and position inside the grips 13 to protect the hands from being injured by hitting a wall or other rigid objects while moving the scooter upon freight transportation or amusement ride.

Figure 6:
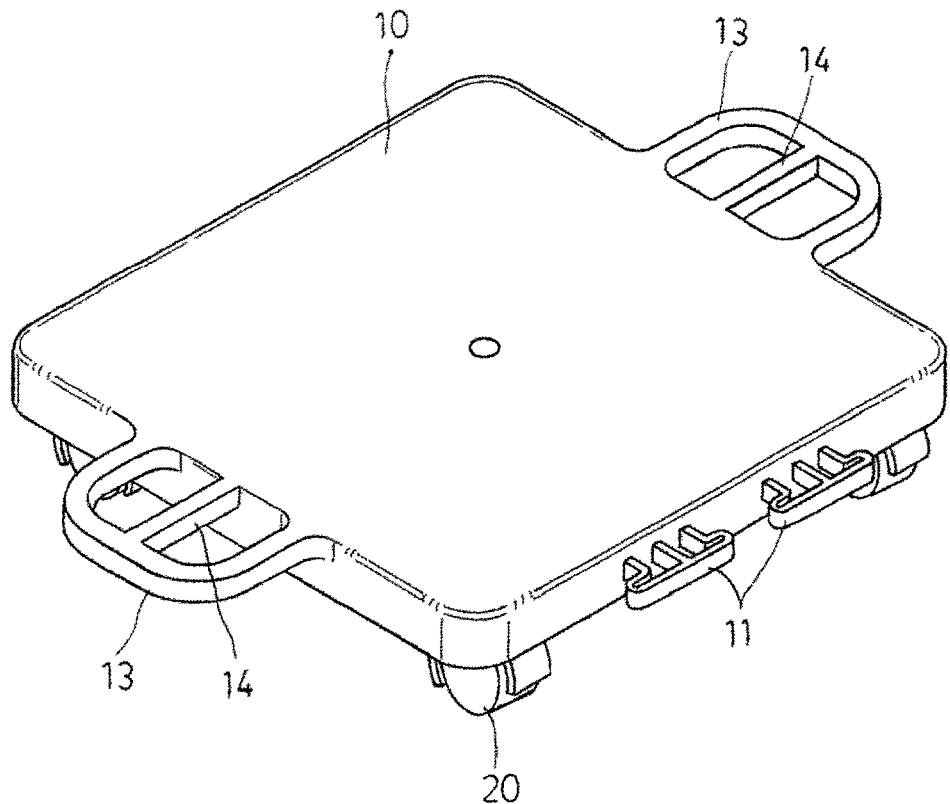
FIG. 6 is a schematically perspective view of another preferred embodiment of a movable scooter of the present invention.

Referring to FIG. 6, which is another preferred embodiment of a handguard structure for a movable scooter according to the present invention, a frame-typed grip 13 is respectively configured on left and right sides of a single main body 10, and a transverse inner bar 14 is configured between one side of the main body 10 and outer bar body of each grip 13 and located at the center of the frame-typed grip 13, allowing a user's hands to grasp the inner bar 14 and position inside the grip 13 to protect the hands from being injured by hitting a wall or other rigid objects while moving the scooter upon freight transportation or amusement ride.

Figure 7:
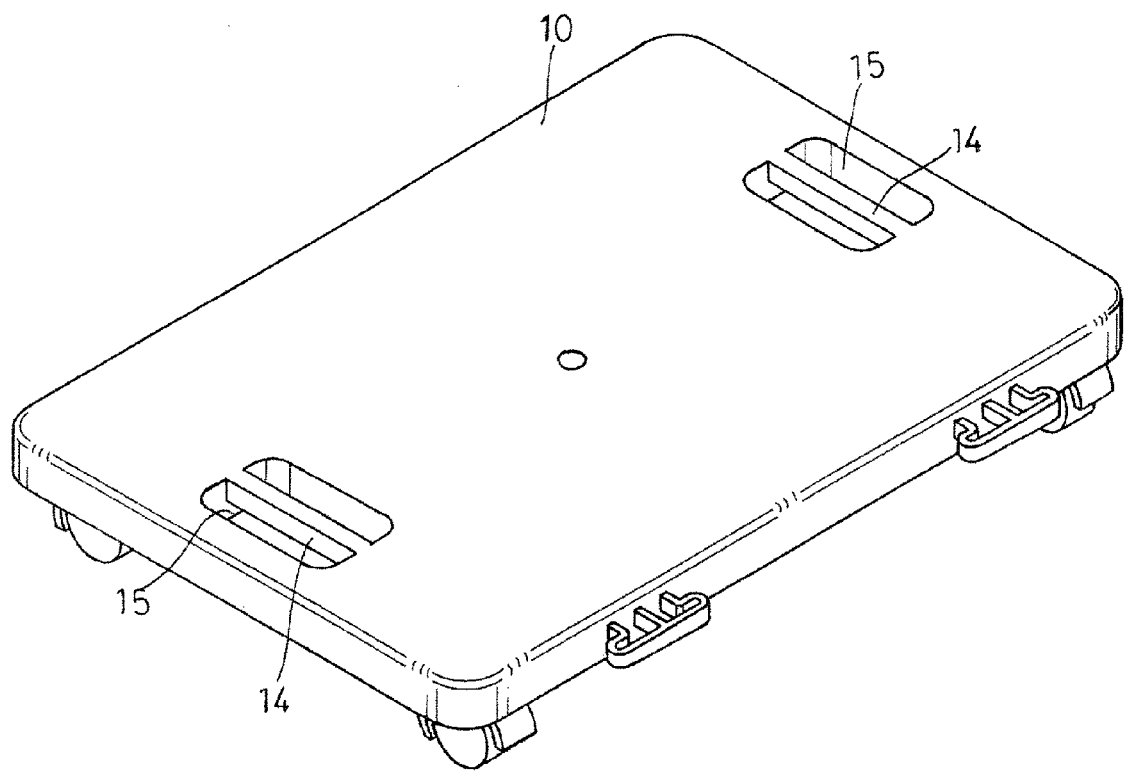
FIGS. 7 and 8 are schematically perspective views of other preferred embodiments of a movable scooter of the present invention.
Figure 8:
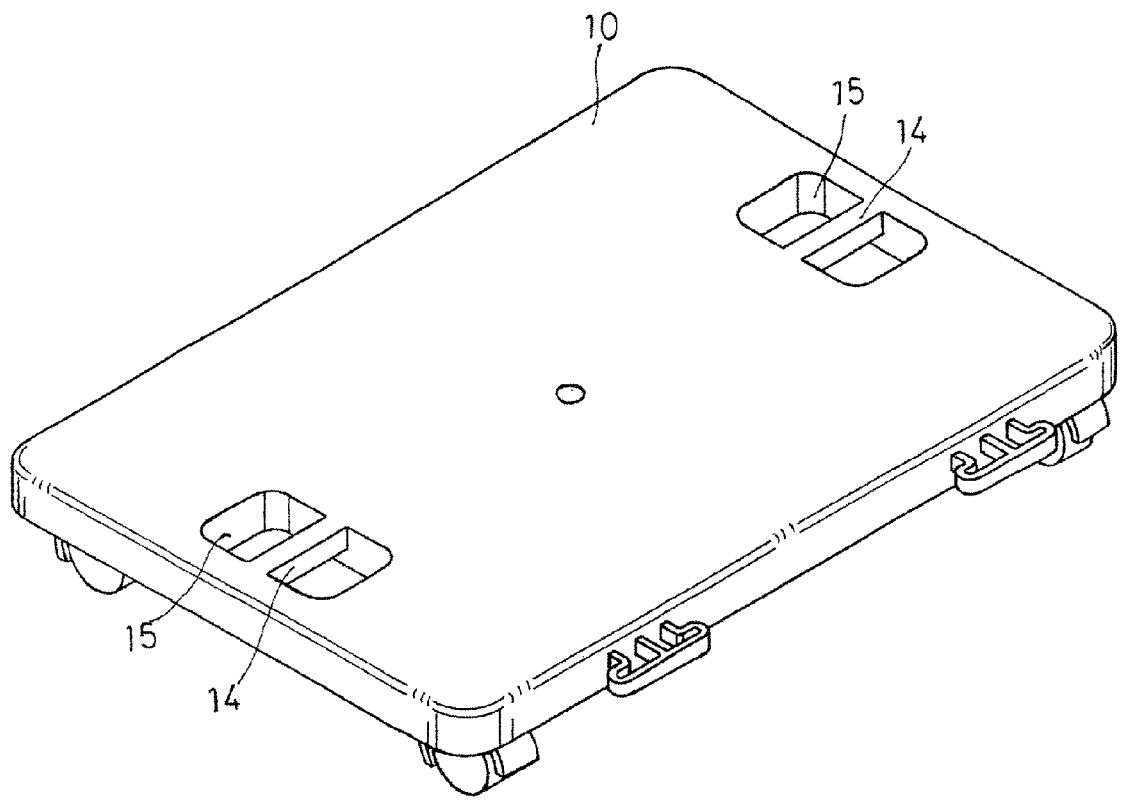

FIGS. 7 and 8 illustrate other preferred embodiments of a handguard structure for a movable scooter according to the present invention. A through hole 15 may be respectively opened on the left and right sides of the main body 10 of the scooter, and a longitudinal inner bar 14 is configured between the front and rear sides of each through groove 15 and located at the center thereof as FIG. 7 shows, or, a transverse inner bar 14 is configured between the left and right sides of each through groove 15 and located at the center thereof as FIG. 8 shows.

I claim:

1. A scooter, comprising a main body in the form of a plate having a bottom, a front side, a rear side and two opposite lateral sides, a plurality of wheels mounted to the bottom of the main body, a grip mounted to each of the respective lateral sides of the main body, a plurality of engagement lugs formed on the front side of the main body, a plurality of engagement grooves formed in the rear side of the main body adapted to be respectively engageable with engagement lugs on a main body of an additional scooter to connect the main body of the scooter to the main body of the additional scooter, wherein each grip comprises an outer bar operably mounted to each of the respective lateral sides of the main body, the outer bar of each grip spaced from the respective lateral side of the main body to define a space between the outer bar and the respective lateral side, each grip further comprising an inner bar arranged in the space and operably mounted to the main body and located between the respective lateral side of the main body and the outer bar to divide the space into two separate sub-spaces capable of receiving a user's hand therein for holding the inner bar, the outer bar being capable of shielding and protecting the user's hand while holding the inner bar of the grip.

2. The scooter according to claim 1, wherein each grip further comprises front and rear bars which operably connect opposite ends of the outer bar to the respective lateral side of the main body.

3. The scooter according to claim 2, wherein the inner bar of each grip has opposite ends respectively connected to the front and rear bars.

4. The scooter according to claim 3, wherein the inner bar of each grip is located midway between the respective lateral side of the main body and the outer bar.

5. The scooter according to claim 2, wherein the inner bar and the outer bar of each grip extend generally in a same direction as the respective lateral side of the main body.

* * * * *